US00RE40569E

(19) United States
(12) Reissued Patent
Schweitzer, III et al.

(10) Patent Number: US RE40,569 E
(45) Date of Reissued Patent: Nov. 11, 2008

(54) COMMUNICATIONS PROCESSOR FOR ELECTRIC POWER SUBSTATIONS

(75) Inventors: Edmund O. Schweitzer, III, Pullman, WA (US); David C. Wood, Pullman, WA (US)

(73) Assignee: Schweitzer Engineering Laboratories, Inc., Pullman, WA (US)

(21) Appl. No.: 09/810,314

(22) Filed: Mar. 14, 2001

Related U.S. Patent Documents

Reissue of:
(64) Patent No.: 5,680,324
Issued: Oct. 21, 1997
Appl. No.: 08/418,185
Filed: Apr. 7, 1995

(51) Int. Cl.
*H04L 12/26* (2006.01)
*G06F 15/173* (2006.01)
*G08C 19/04* (2006.01)

(52) U.S. Cl. ..... 370/241; 340/870.02; 340/870.11; 700/286; 709/224

(58) Field of Classification Search ..... 370/230, 370/235, 428, 241, 241.1–253; 340/870.02, 340/870.11, 870.16, 538, 657; 709/224, 229, 709/234, 238; 700/286; 375/295, 325, 316
See application file for complete search history.

(56) References Cited

U.S. PATENT DOCUMENTS 4,972,290 A * 11/1990 Sun et al. ..... 361/64
5,160,926 A * 11/1992 Schweitzer, III ..... 340/870.02
5,224,011 A * 6/1993 Yalla et al. ..... 361/93.2
5,428,553 A * 6/1995 Chiba et al. ..... 700/293

* cited by examiner

*Primary Examiner*—Afsar M. Qureshi
(74) *Attorney, Agent, or Firm*—Eugene M. Cummings, P.C.

(57) ABSTRACT

The communications processor includes an electronic network system which includes at total of 17 individual ports, four quad universal asynchronous receiver/transmitter devices, each of which serves four separate ports, and a microprocessor which processes and controls the flow of data under the control of stored control programs, command settings and command logic. Connected to a plurality of those ports referred to as IED ports are intelligent electronic devices IEDS, such as protective relays or meters, while connected to other ports, referred to as master ports, are remote terminal units or a local computer or terminal or a modem which can be connected to an external telephone line. The apparatus includes both buffer and long-term storage for development of a database, as well as an IRIG-B capability for synchronization of the time clocks of the connected devices.

23 Claims, 8 Drawing Sheets

| LEVEL | ISR |
|---|---|
| 7 (HIGHEST) | CLOCK HANDLING ISR (EVERY 1.0 Msec.) |
| 6 | FRONT PANEL SERIAL ISR |
| 5 | PORTS 13-16 ISRs |
| 4 | PORTS 9-12 ISRs |
| 3 | PORT 5-8 ISRs |
| 2 | PORT 1-4 ISRs |
| 1 (LOWEST) | PERIODIC INTERRUPT TIMER ISR (EVERY 3.4 Msec.) |

COMMUNICATIONS PROCESSOR FOR ELECTRIC POWER SUBSTATIONS

Matter enclosed in heavy brackets [ ] appears in the original patent but forms no part of this reissue specification; matter printed in italics indicates the additions made by reissue.

TECHNICAL FIELD

The invention relates generally to protection systems for electric power lines, circuit breakers and transformers, and more particularly concerns a communication processing apparatus which is to be used primarily at electric power substations for integrating communications with and between the various protective devices and other supporting devices located at a substation.

BACKGROUND OF THE INVENTION

Electric power systems generally include high voltage (>69KV) transmission lines from a generating means, a number of substations, and a network of distribution (<69KV) and feeder lines for the delivery of electric power to the customers. An electric power system typically includes a number of protective relays, as well as other protection devices, which monitor the operation of the power system and determine, among other things, when and where a fault occurs in the system. Circuit breaker devices are in turn controlled by the protective relays.

Historically, protective relays were mechanical or electromechanical (a large number of such relays are still in use), while more recently, protective relays are typically microprocessor-based and are usually referred to as digital or computer relays. These computer relays typically record a significant amount of information for the power lines associated with the substation, including voltages and currents on the power lines, as well as complete "event" information relative to any abnormal (fault) conditions. This information is stored in the memories of the computer relays.

The relays provide output signals, when appropriate, which are used to control associated circuit breakers operating on the power lines. The information stored in such relays can be transmitted to a central facility and/or accessed locally via a printer terminal. Comprehensive system monitoring is accomplished by what is known generally as a SCADA system, which stands for Supervisory Control and Data Acquisition, and which is widely known and used.

A development which resulted in some communication integration of the various protective relays and other supporting devices at a substation is known as a protective remote terminal unit (PRTU). The PRTU includes a modem for remote telephone communication, as well as control software for basic communication purposes, and is capable of handling input information from several different protective relays. The PRTU includes a simple data buffering capability, as well as a local port for a terminal, printer or computer. Another development, known as a display transducer adaptor (DTA), provides analog output information from the digital information available from microprocessor-based protective relays. This is helpful for integration of the protective system with analog SCADA remote terminal units. Such a system is shown in U.S. Pat. No. 5,160,926, which is assigned to the same assignee as the present invention.

In another system integration approach, each protective relay or other intelligent electronic device (IED) in the protection system is connected to a communication network bus through a network interface module (NIM). Each NIM must be separately programmed to retrieve, store and distribute IED information. A human machine interface, such as a personal computer with a monitor, provides local control and monitoring. The system can communicate with a SCADA system through a remote terminal unit at the substation. A modem may also be included, for communication with remote network devices.

Some of the prior communication integration systems included the capability of automatic scanning port-to-port for any data present at the port data buffers. Some systems could also respond directly to a particular port upon an indication of a fault condition recognized by the relay connected to that port. Some terminal units had additional data buffering capability, enabling them to communicated with a central monitoring (SCADA) system or a computer system through a conventional modem. In some systems, the data had to be reformatted to an ASCII format for use by a printer. Other devices, however, were completely transparent to the data received from their ports.

The systems described above, while achieving some communication integration at the substation level, were not capable of processing the information received from the ports, nor did those systems have a database capability. These disadvantages significantly limited the capability of the communications systems. It was the applicants herein who recognized the full communication integration opportunities possible at the substation level and developed an apparatus to take advantage of those opportunities.

SUMMARY OF THE INVENTION

Accordingly, the present invention is a communications processor apparatus for integrating communication between a plurality of electronic devices having data communication capability, such as protective relays, meters, terminal devices and a computer present at a given location in a power system, such as a substation, or connected remotely thereto, the apparatus including an electronic network system having a plurality of port positions to which electronic devices may be connected, including at least one port position to which an apparatus for entry of control commands may be connected and at least one port position through which data obtained from said electronic devices may be obtained; means for storing and retrieving data obtained from the electronic devices; means for processing data obtained from the electronic devices; and control means for controlling the flow of data and control commands between said ports.

BEST MODE FOR CARRYING OUT THE INVENTION

Figures 1, 4:
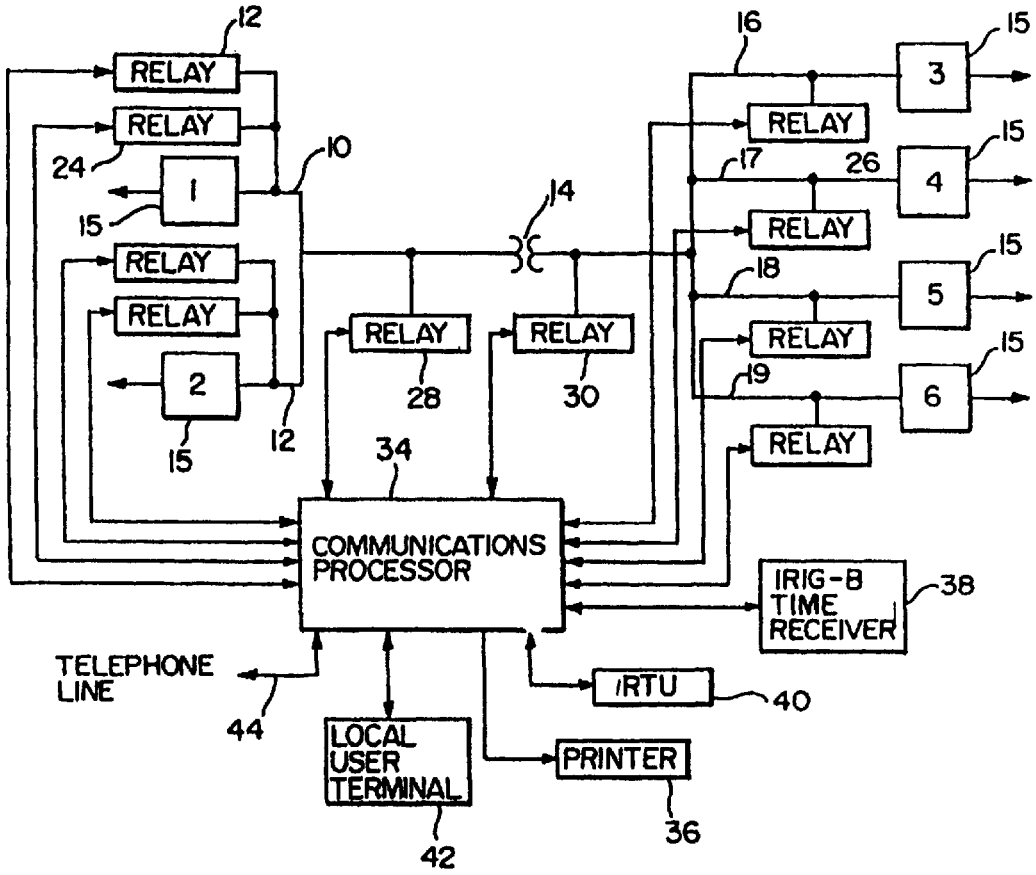
FIG. 1 is a block diagram showing a representative configuration, including the communications processor of the present invention.
FIG. 4 is a listing showing the hierarchy of interrupts in the communications processor.

FIG. 1 shows a simplified power system substation configuration. The substation includes a pair of incoming high voltage power transmission lines 10 and 12 connected to the high voltage side of a transformer 14. Connected to the low voltage side of the transformer 14 are a plurality of distribution lines 16, 17, 18 and 19. Each of the transmission lines and each of the distribution lines has a circuit breaker (CB) system 15—15 associated therewith. Connected to each of the high voltage lines 10, 12 are a pair of protective relays, for example relays 22 and 24 for high voltage line 10, while connected to each of the distribution lines is one protective relay, for example relay 26 for distribution line 16. Relays 28 and 30 are connected, respectively, to the high voltage and low voltage sides of transformer 14. The relay configuration shown in FIG. 1 is a typical arrangement for a power substation.

Each of the protective relays shown in FIG. 1 includes a particular combination of protective elements (for example, ground and distance elements) which provide the desired protection for the particular power line associated with the relay. Hence, the relays on the distribution lines will have a different combination of protective elements than will the relays for the high voltage lines and the relays on the two sides of transformer 14.

All of these relays are connected, respectively, to an input port of the communications processor of the present invention, referred to generally at 34. Communications processor 34, besides having a number of ports for connection to protective relays, referred to as IED (Intelligent Electronic Device) ports, will also typically include at least one port for a local printer 36, and a port to receive a modulated or demodulated IRIG(B) time code from an external source, shown generally at 38. Additional ports for a remote terminal unit 40, a local user terminal such as a computer 42, and a modem connection for use with an external telephone line 44 are referred to herein as master ports.

In the embodiment shown, there are 16 rear panel ports and one front panel port for a local terminal. With respect to telephone line 44, the communications processor 34 can either include an internal modem, or a modem external to the processor can be used. Typically, processor 34 will have a large number of ports (10–12 in the embodiment shown) capable of communicating with IEDs such as protective relays or meters, a relatively small number of "master ports" to which are connected devices such as computers and remote terminal units for the entry of commands and/or the output of data, and a small number, typically one, of ports adapted to connect with a printer. It should be understood, however, that each of the 16 rear ports can be a IED, master or printer port (the front panel port is a master port). The identification of particular ports as being IED, master or printer ports is for the convenience of the user.

It should be understood that the number of ports in communications processor 34 and the particular arrangement of the ports relative to the devices connected thereto can be changed within the spirit of the present invention. The present invention is thus not limited to the particular number of ports and/or arrangement shown in FIG. 1, which is for illustration only. FIG. 1 does illustrate, however, the basic integration capabilities of the communications processor of the present invention, including the accessibility of data from each of the protective relays at a substation, control of connected relays and other intelligent electronic devices, the provision of synchronized time information from the IRIG (B) time code input, the capability of communication with a remote monitoring system through a modem/telephone line and/or another similar communications processor, the capability of providing information to a local printer, and the capability of receiving input commands from a local or remote terminal. Commands can be provided either at the substation through a local terminal or computer 42, from a remote terminal unit 40, or over the telephone lines.

It should also be understood that communications processor 34 can operate either as a stand-alone device at a particular substation, or can be part of a more comprehensive monitoring system, i.e. a SCADA system. Two or more communications processors can also be connected together, i.e. cascaded, to provide increased integration at one or more substations.

Figure 2:
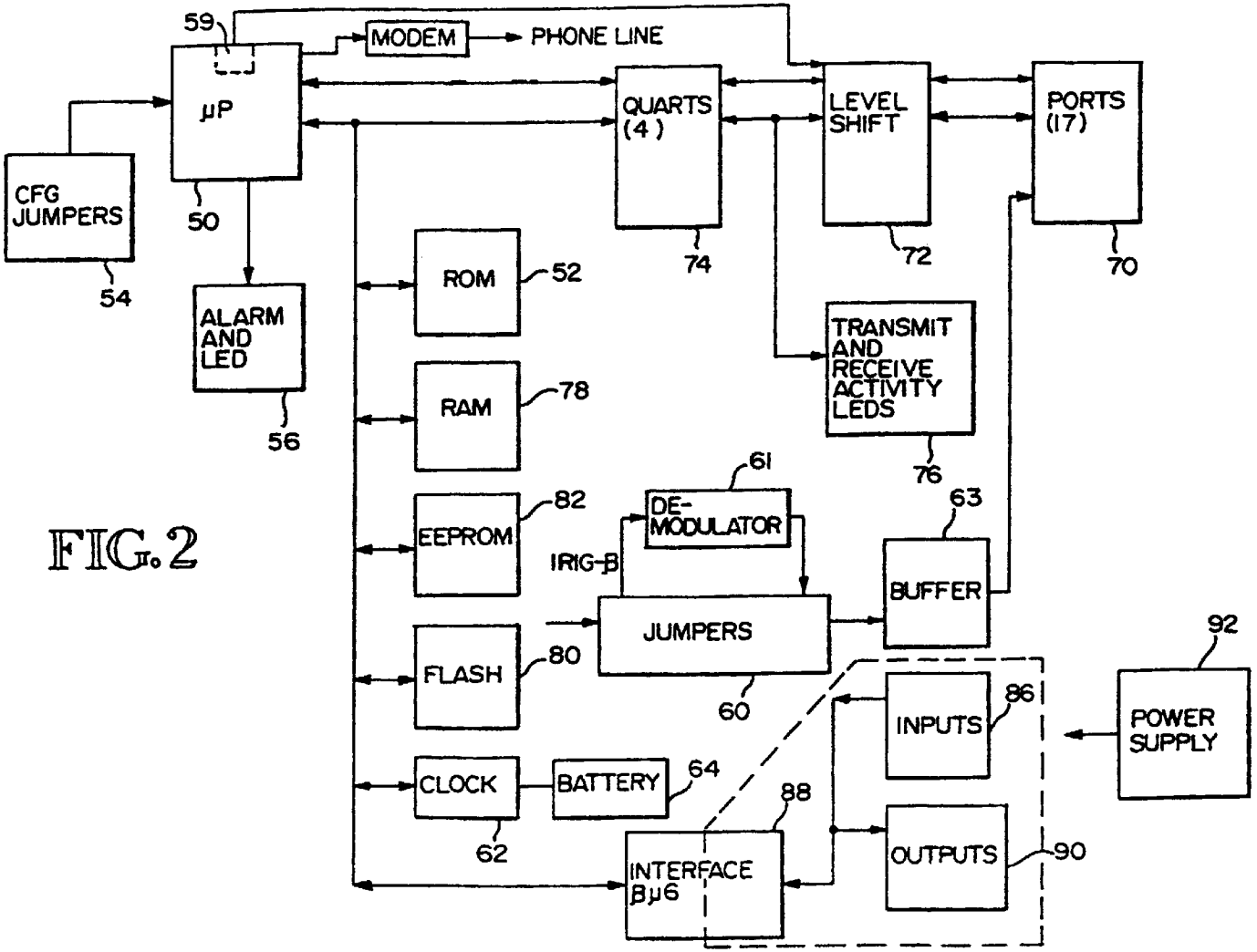
FIG. 2 is a block diagram of the communications processor of the present invention.
Figure 3:
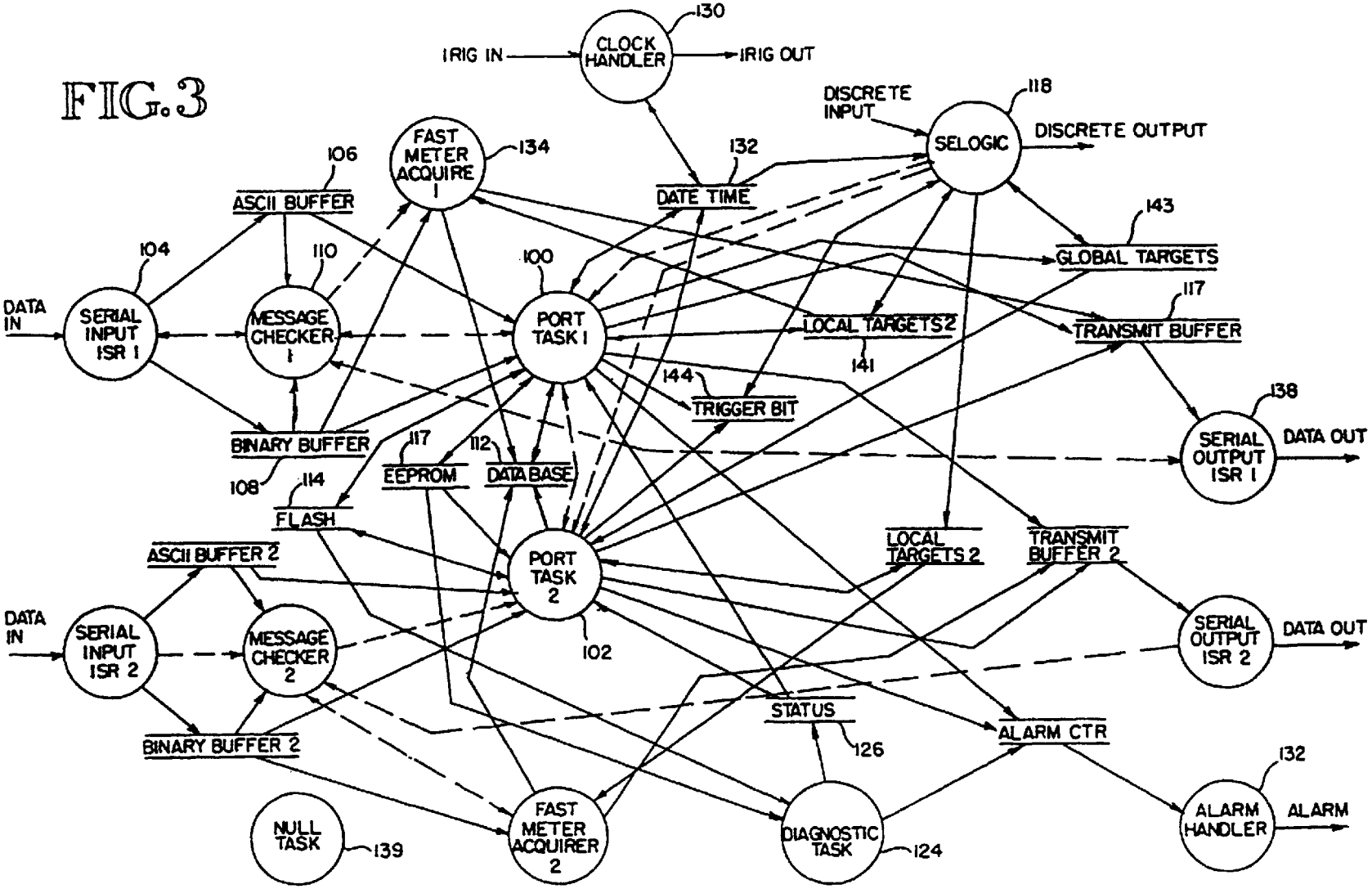
FIG. 3 is a high level software data flow and command chart showing the flow of data and the flow of operations control for the communications processor of the present invention.
Figure 5A:
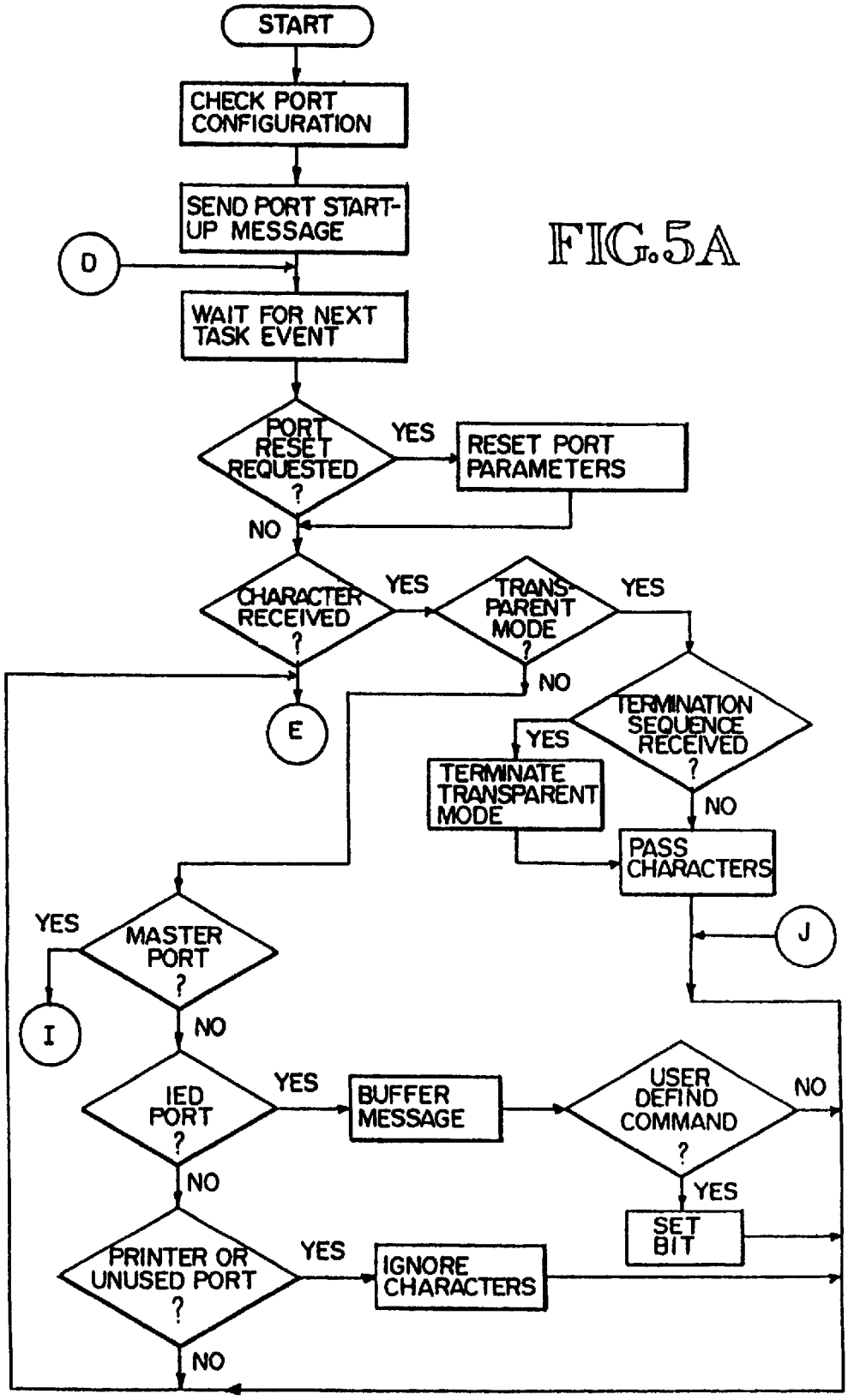
FIGS. 5A–5C are software flow chart diagrams for a portion of the chart of FIG. 3.
Figure 5B:
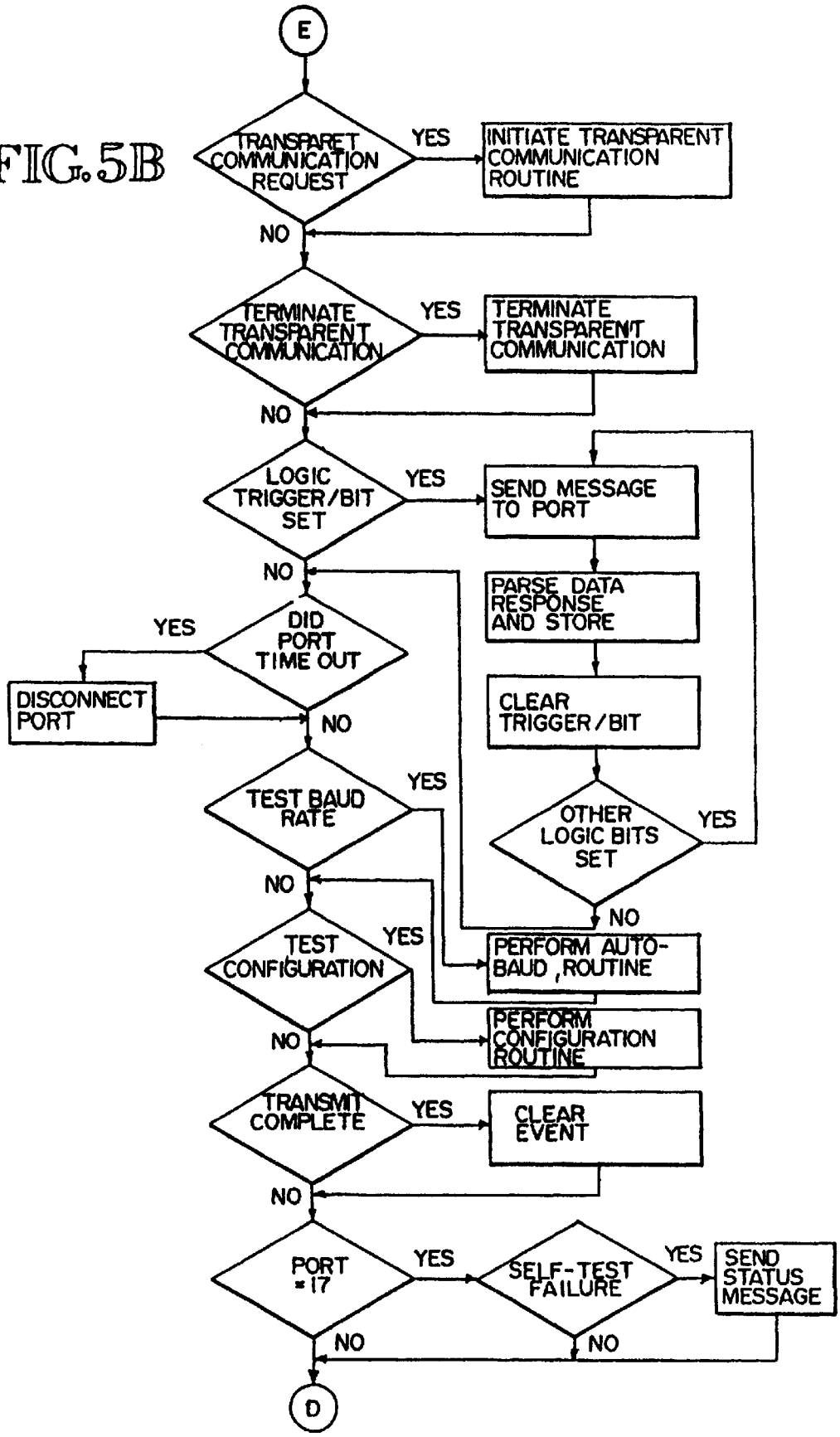
Figure 5C:
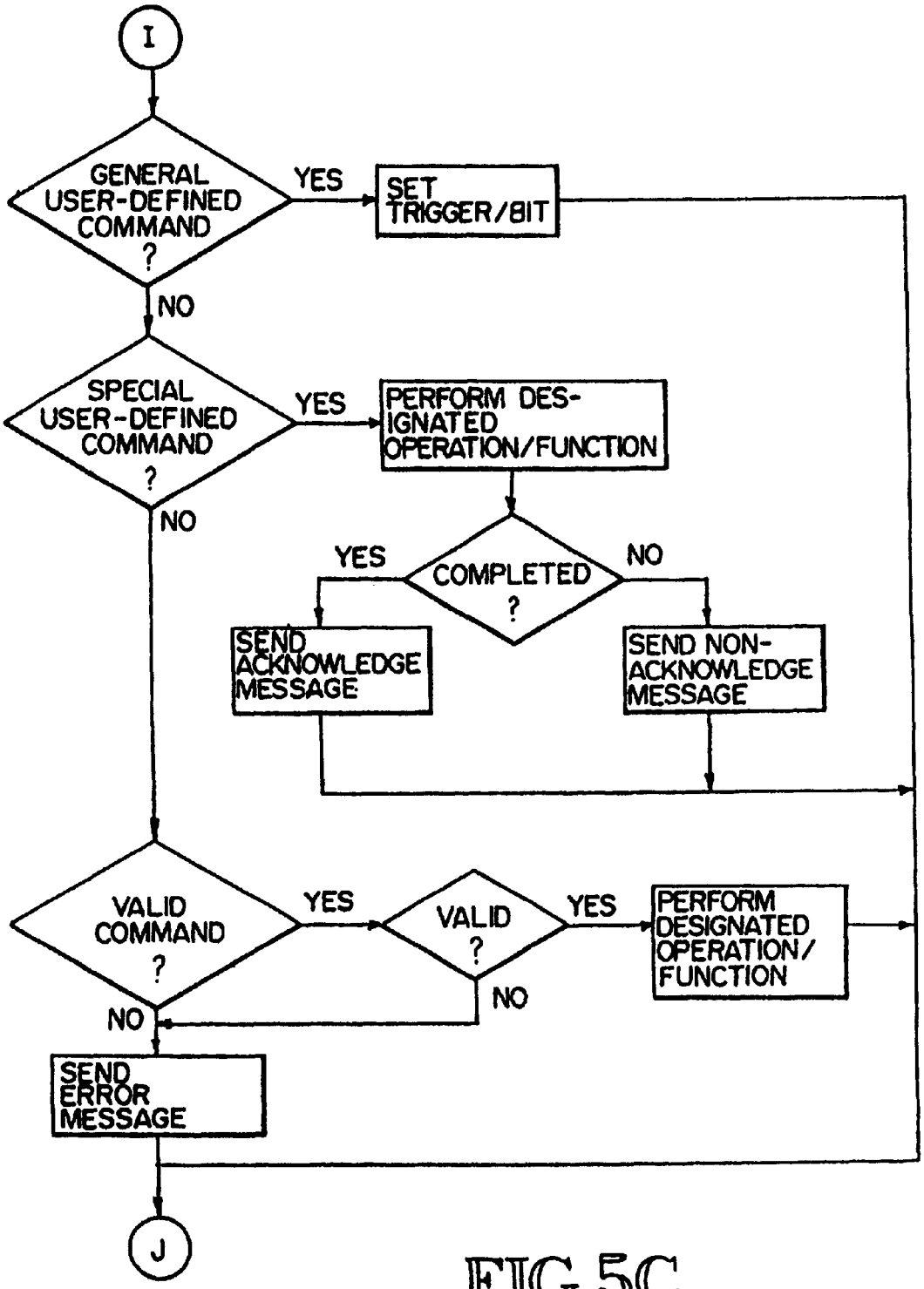
Figure 6A:
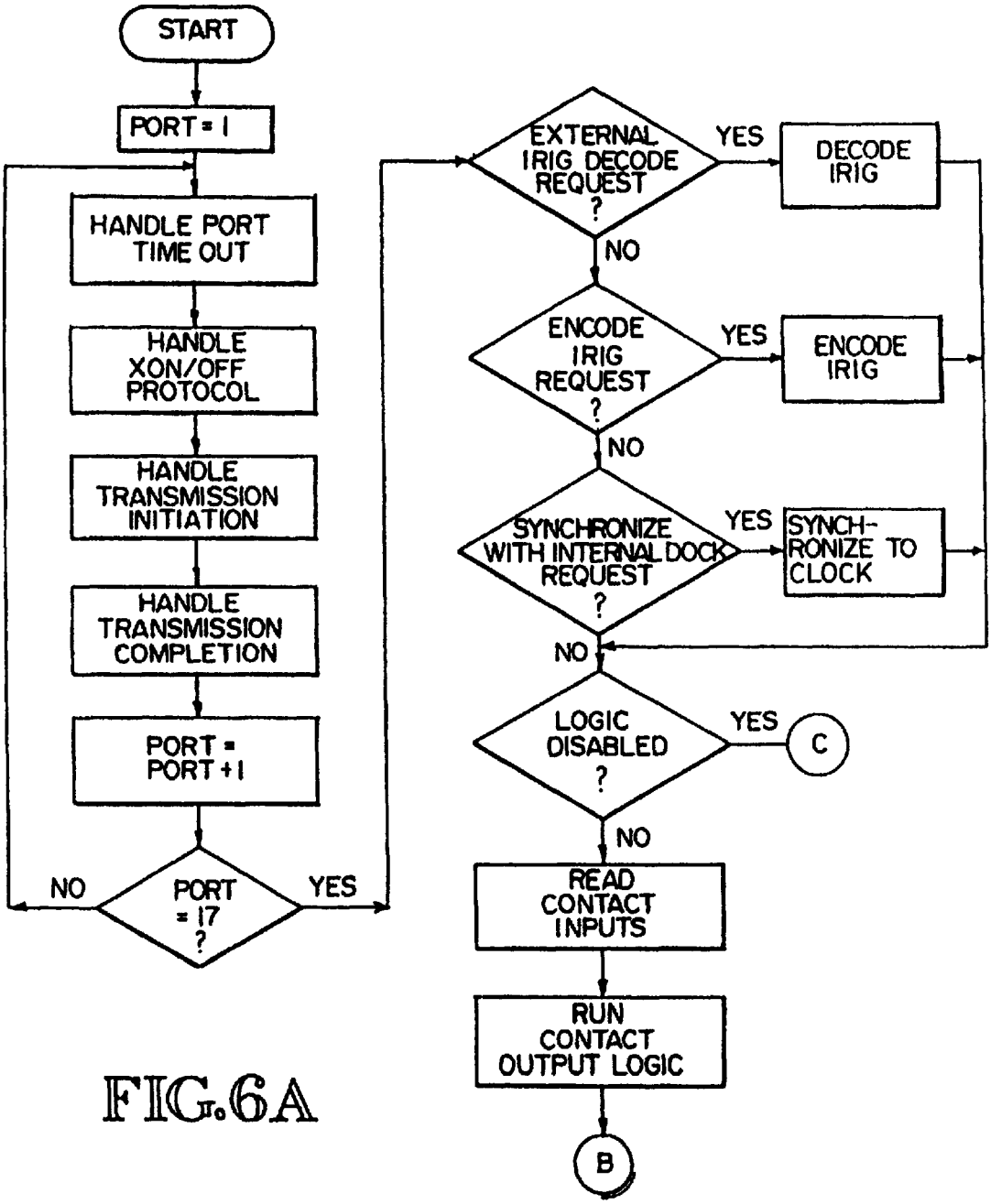
FIGS. 6A–6B are software flow chart diagrams for another portion of the chart of FIG. 3.
Figure 6B:
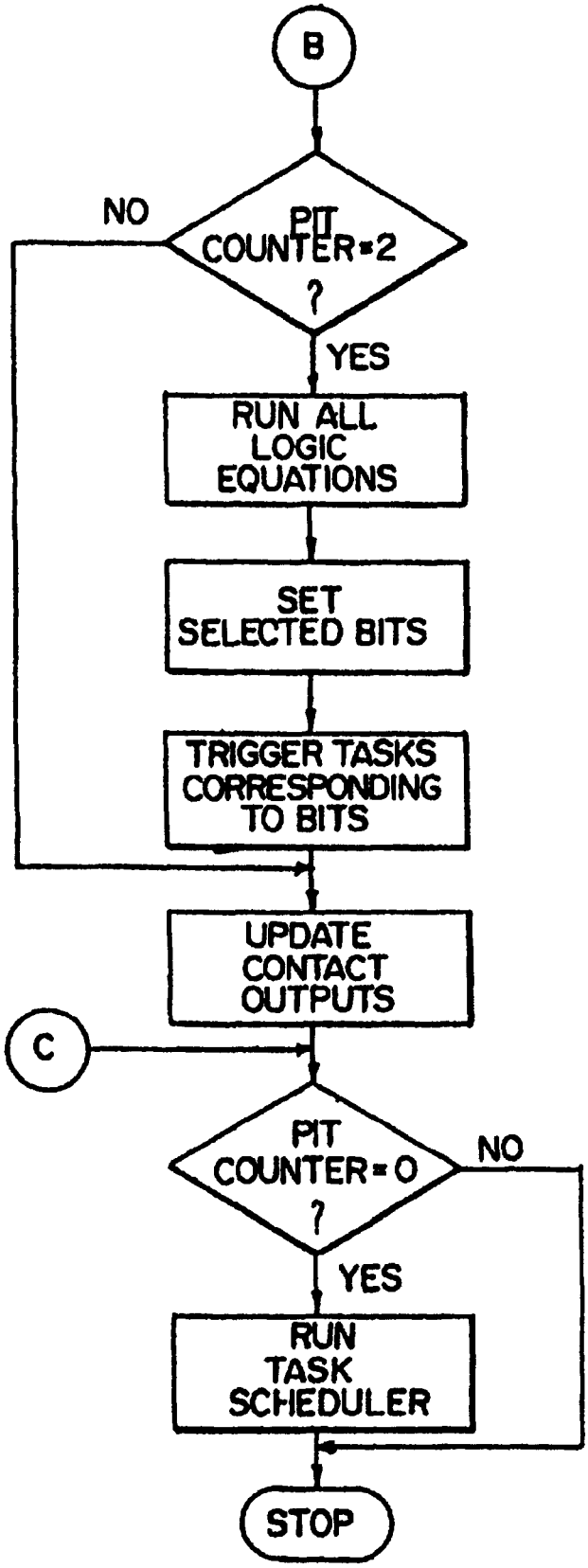

FIG. 2 shows a basic block diagram of the communications processor 34. Communications processor 34 includes a microprocessor 50. The microprocessor used in the embodiment shown is a Motorola 68332, but other comparable microprocessors can be used. As will be discussed below, microprocessor 50 has a number of processing and control functions, including an input handling function or routine and a message generating function or routine for each port, as well as the execution of program instructions stored in memory which carry out the overall flow and organization of the data. These instructions are stored in ROM memory 52. A high level software flow chart for data control and data flow is shown in FIG. 3, which will be explained in more detail below.

The microprocessor also includes a number of configuration jumpers, which are shown collective at 54, which are responsible for establishing certain initialization conditions, such as front panel port communications parameters. The microprocessor 50 also has the capability of providing an independent alarm output upon recognition of an alarm condition, by means of alarm unit 56. Alarm 56 includes a light-emitting diode (LED) visual indicator.

Microprocessor 50 is in communication with remote terminal units or other systems via a standard telephone line and a modem 58. As indicated above, modem 58 may either be internal to the communications processor itself or external thereto. Communications processor 34 also has, as indicated above, a time synchronization capability. Communications processor 34 accepts either a modulated or demodulated IRIG-B signal through a rear panel connector. If the signal is modulated, it is demodulated at 61. An internal jumper 60 identifies whether the incoming time signal is modulated or demodulated. The IRIG-B signal is an internationally known, well-recognized time code signal for establishing time synchronization.

If there is no external IRIG-B signal available, an internal clock/calendar 62, which is powered by a battery 64 when the communications processor is not connected to an external power source, provides a time signal which can be used for time synchronization of the various port-connected devices. Typically, internal clock 62 is accurate to within one minute per year, with battery 64 having an expected life of 10 years. The IRIG time signal (or the internal clock time signal) is applied to a buffer 63, and then distributed to all of the port-connected devices. The communications processor 34 of the present invention is capable of both data communication and IRIG-B time code transmission over a single cable.

The microprocessor 50 is in data communication with the various port devices through a plurality of EIA-232 (RS-232) serial ports, as indicated above, shown as a group at 70. In the embodiment shown, there are a total of 17 ports, 16 rear panel ports and one front panel port. The front panel port is typically for a local terminal unit of some kind (at the substation). Associated with each port is a level shifter 72, which adjusts the voltage level between the TTL voltage level used in the microprocessor, which is typically 1–5 volts, and the ±12 volt levels appropriate for EIA-232 ports.

Intermediate of level shifters 72 and the microprocessor 50 are four quad universal asynchronous receiver transmitter devices (QUARTS). The QUARTS each service four ports, for a total of 16 ports, while the front panel port in the embodiment shown is serviced by a serial communications interface 59 in the microprocessor 50. QUARTS are well known, commercially available devices, and may be purchased from various manufacturers, such as Signetics, Inc. Hardware communication thus extends between microprocessor 50, a QUARTS 74, a level shifter 72 and an EIA-232 serial port 70, supported by ROM memory 52 and other memory discussed below.

Communications processor 34 in the embodiment shown also includes transmit and receive activity LEDs for each port 70, shown generally at 76. The LEDs are located on the front panel of the processor. Thus, an operator can tell whether data is being received from or transmitted to each device connected to the various ports.

The data received from the various devices, such as meter data, summary event reports, target data and status data, is temporarily stored (buffer storage) in random access memory (RAM) 78. This includes both local buffer storage for the data received at the individual ports and storage of processed data. For long-term storage, such as for saving entire event reports, "flash" memory 80 is used, which is also a RAM. Flash memory 80 is non-volatile, so that it is not lost in the event of loss of power.

The electronically erasable, programmable, read-only memory (EEPROM) 82 is used in the embodiment shown to store various setting commands (settings) provided to the apparatus through a master port, including user-defined commands and the command logic to implement them. Accordingly, an operator need only provide relatively simple, short commands to produce various repetitive or special operations by the processor. In the embodiment shown, a first group of command settings (for each port) includes port configuration and communications parameters; a second group of command settings includes buffer storage control, automatic message triggers, data processing (parsing) for that port, message control for flash memory, and user message storage. A third group of command settings includes global parameters for the entire instrument, intermediate logic variables and input settings for the output contacts described below. A fourth group of commands is for the user-defined message strings or can be used to supplement or disable the normal communications processor command set. In the embodiment shown, each port has the capability of recognizing up to eight user-defined commands, although this can be varied.

Hence, the communications processor 34 of the present invention is characterized by sophisticated communication processing functions, and by comprehensive data storage, providing a substantial database capability within the apparatus. The communications processor 34 also has the capability of receiving inputs from the various protective relays directly through contact inputs 86. These inputs could include alarm contacts from those relays or relay failure contacts. The inputs could also include contacts from other monitoring apparatus not having a data communications capability or other power apparatus having auxiliary contacts. An interface bus 86 connects these contact inputs with the microprocessor 50. The communications processor 34 has contact outputs 90 as well, which are used to output a trip signal, for instance, to a circuit breaker or similar device. In the embodiment shown, there are 16 contact inputs and four contact outputs. Lastly, FIG. 2 also shows a power supply 92, which provides the various levels of power needed for operation of communications processor 34.

In operation, communications processor 34 of the present invention has a capability of communicating with the various port devices thorough an ASCII communication format. The ports can be individually configured to the particular communication parameters of the connected device through the setting commands, including baud rate, number of data bits, stop bits, parity check, port time-out time and on-off control. This can be done on an automatic configuration basis, through pre-programmed instructions, if the communications processor 34 knows the required configuration for a particular device. Communication with the ports can also be formatted so that the processor, on a port-by-port basis, may be transparent to the information from IEDs, i.e. binary information from IEDs can be directly outputted to a local terminal or to a remote location via a modem. Further, processor 34 has the capability, as indicated above, of synchronizing all of the devices connected to its various ports to a given date and time, either via an external IRIG(B) signal which is transmitted to the various ports along with the data/message communication, or by an internally generated time signal. Communication with the various port-connected devices is thus quite flexible and convenient. The structure and processing capability of the apparatus is capable of supporting simultaneous communication with all the port-connected devices, with multiple users. Hence, communications processor 34 is a multi-task, multi-user apparatus.

FIG. 3 is a high level software design flow chart for the processor apparatus of the present invention. It is the basic design document by which a skilled programmer can produce the specific code to carry out the communications processing and control functions of the present invention. FIGS. 5A–5C and 6A–6B show software flow chart information for particular portions of FIG. 3. The circles in FIG. 3 indicate specific program routines, each of which will be described in some detail below, while the solid, closely parallel lines represent data storage. The solid connecting lines represent data flow paths, while the dotted connecting lines represent command control paths.

Each of the 17 ports in the embodiment shown has a basic processing routine associated therewith, referred to as a port task or routine. FIG. 3 shows the various routines and data storage for two ports. This is representative, both in a global sense and in an individual port sense, of the software operation and control for all 17 individual ports and the apparatus as a whole. FIG. 3 may thus be easily expanded to cover all 17 ports.

FIG. 3 shows a port task or routine 100 associated with a first port, and a port task or routine 102 which is associated with a second port. Port task 100 is responsible for the processing and control functions associated with the transmission of data between the port associated with the port task and the device connected thereto. As indicated above, the communications processor of the present invention has 17 total parts, 16 of which are serviced by four QUARTS. Each QUART generates interrupts to the microprocessor 50 for communication with each of the four port devices connected to the QUART.

The QUART generates separate interrupts for input communication from the devices and output communication to the devices. Microprocessor 50 services the interrupts by executing an Interrupt Service Routine (ISR). As an example for one particular port, ISR 104 handles the input communications for that one port serviced by a QUART, while ISR 138 handles the output communications for the same port. Similar ISRs handle input/output communications for the remaining three ports for the QUART. The data received by input ISR 104 can either be in the ASCII format, such as an input command from a terminal or modem, or in binary format, such as from a protective relay IED. The ISR input routine reads the characters one by one as they come in, responding to a sequence of interrupts from the QUART. The data is placed either in an ASCII buffer 106 or a binary buffer 108, as appropriate. A message checker routine 110 checks the data as it comes in to determine the end of the data stream or message.

At this point, the port task 100, which is in data communication with buffers 106 and 108, and receives control information from the message checker 110, takes over. For an incoming message from an IED port, which may be unsolicited or in response to a periodic or special message request established by the command settings, task 100 will process the message by parsing (processing) it in accordance with various pre-established rules established by the command settings, and then storing it in a buffer in Ram database 112, or if it is an event report, in long-term flash memory 114.

The port task 100 is in operation responsive via command flow lines to settings which as discussed above have been pre-established in EEPROM or to user-defined commands, which are recognized as standing for a particular sequence of operations which are carried out by the processor in accordance with instructions in EEPROM 117. Settings can be established to carry out repetitive functions. Such a setting will include an "issue condition", which defines when a particular request is to be carried out by a port task, e.g. every two seconds, while a "command condition" portion of that setting establishes the particular request, e.g. obtain meter data from the connected IED or send a message to a master port. In response to the occurrence of a defined issue condition for an IED port, a bit is set in a "local target" area (141 in FIG. 3), which is recognized by the port task and which in turn makes the associated command condition request for data from the IED. The request for data proceeds through transmit buffer 119 by operation of output ISR 138 to the IED. When the requested data is provided by the IED (usually within a very short time), by operation of ISR 104, the last part of the setting, which establishes the data parsing condition, is accomplished by port task 100.

Date and time functions for the apparatus are carried out by a clock-handling ISR 130. This ISR is responsible for clock maintenance, updating the clock for the apparatus, and correcting the clock for crystal error. If an external (modulated or demodulated) IRIG time code is present, clock handler 130 reads this particular time and applies it to date/time storage 132, which is accessible by both port task routine 100 and a periodic interrupt timer ISR 118, which, among other things, runs the command logic. The clock handling ISR is also responsible for monitoring RAM storage for failures.

FIG. 3 also shows a fast meter acquisition routine 134 which is responsive to fast meter data from binary buffer 100, after it has been recognized by message checker 110. The fast meter data is raw voltage and current samples which are obtained in binary form from the IEDs. The communication processor 34 may calculate other quantities from the data including current and voltage phasor angles. The fast meter data is then stored in database 112.

There is a hierarchy of interrupts in the processor between the various ISRs. This is shown in FIG. 4. The highest priority is the clock handling ISR which in the embodiment shown runs approximately every 1.0 milliseconds. Then there is the front panel port ISR, the various other port ISRs and the periodic interrupt timer (PIT) ISR, which runs every 3.9 milliseconds. The various interrupts are initiated by the receipt and transmission of characters. The first thing every interrupt routine must do is to read an interrupt register in memory to tell which port is being interrupted and whether it is a transmit or receive interrupt. The appropriate ISR then uses either the receive or transmit ISR routine to accomplish the desired action.

The function of the various port ISRs and the clock handling ISR have been described above. The periodic interrupt timer (PIT) ISR, as indicated above, runs the command logic present in the EEPROM which results in the machine instructions associated with particular user-defined commands, but also handles many of the real time task scheduling within the communications processor. It handles on/off software procedures, referred to as XON/XOFF in the embodiment shown, for the serial ISRs, as well as initiating action of the appropriate port task when data is received at that port, as well as other monitoring functions. There is data flow between PIT ISR 118 and local (port) targets (control bits) 141 which are set in memory, as well as global (apparatus) targets 143. A port task can also force an action from PIT ISR 118 via setting a trigger bit 144 in memory.

The apparatus also includes a diagnostic task routine 124, which is a self-test routine monitoring the ROM, EEPROM and flash memories, as well as the power supply. This task sets status bits 126 if failures occur. The Ram diagnostic test is handled within clock handling ISR 130, as indicated above. The status bits are recognized by the port task (e.g. port task 100), which in turn sets an alarm counter 128 for a certain period of time or a flag associated therewith. Alarm handler 132 causes an alarm contact to be closed for the specific period of time or permanently, if the flag has been set.

The null task 139 is initiated upon power on of the apparatus. It is a routine which initializes all of the other routines/tasks in the apparatus.

As indicated above, operation of the processor is determined by command settings provided for each port, including user-defined commands which are carried out via the command logic is EEPROM. When the issue condition portion of a setting for a particular port device is recognized, a local target flag 141 is set, and port task routine 100 issues a request for certain data established by the command condition portion of the setting, by operation of output ISR 138 to the IED connected to the port. The relay then sends back the requested data, usually very quickly (within a few seconds or less). The received data characters are buffered into the apparatus through input ISR 104, processed by the port task routine, and then stored temporarily in RAM database 112. If the input is recognized as being fast meter binary data from those relays capable of providing raw voltage and current data, that information is recognized by the message clock routine 110, processed by the fast meter routine 134, and also stored in the RAM database.

It is important to understand that each port has significant processing capability associated therewith, including a port task routine, serial input and output ISRs, a message checker, ASCII and binary input buffers, a transmit buffer and a fast meter data acquisition task. The port task has a data communication capability with RAM, flash and EEPROM memories and is responsive to flags set in the local and global target (control bit) areas in memory. The port task also has the capability through setting a trigger bit in trigger storage 144 to override the normal logic for a particular bit. There are three buffers associated with each serial port, an ASCII receive buffer, a binary receive buffer and a transmit buffer. These buffers are used to move data between the serial ISRs (both input and output) and the port tasks.

Associated with each port is a port data structure in Ram memory. Within the port data structure are five data fields used for inter-process communication within the apparatus. There is an operation field which indicates the pending operations for the particular port task. There is also a type field which indicates the type of device connected to the port, a mode field which indicates whether the port is currently in transparent or direct mode, a requester field which is used in some communication processes to indicate which other port task is requesting a particular process of the port, and a request code field which is used to define the nature of that request.

Within each port structure in addition are flags and timers which are used by the serial and PIT ISRs for controlling data communication. These include, among others, XON and XOFF flags, initiate transmission, transmission completed and end-of-message flags. The input buffers are also within the port data structure.

The data which has been stored in the database 112 can either be viewed, with an appropriate command, or sent out any port or ports, either in response to a particular command or automatically, in response to user-defined commands recognized by the port receiving the command. A map command can also be used to see the organization of the data in a port database. Upon completion of input handling by the input ISR for the port receiving the command, a bit is set. The bit is recognized by port task 100 and the desired data is then retrieved from database 112. The data is formatted properly for the device to which the data is to be transmitted and then directed through the transmit ISR 138 to the selected local terminal or over a telephone line to a remote terminal apparatus.

The transmitted information, as briefly noted above, has been previously processed by the port task upon the receipt thereof from a port device such as an IED. This process is referred to as parsing. The incoming data from the IEDs is parsed in accordance with certain rules. Parsing basically is designed to produce the smallest useful element or byte size of the data. This reduces the communication and processing burden for other devices by permitting them to request and obtain only the specific data they need. Parsing can be accomplished in a number of conventional ways, including saving of numbers only (ASCII integer), saving of numbers plus any decimals (ASCII float), saving of all numbers and characters in a character string and a most significant/least significant byte arrangement. Other types of parsing may be used as well.

Data which comes into the communications processor apparatus from an IED port in response to a command or request message is referred to as a solicited message. These messages can be parsed and stored, as indicated above, in database 112. Another type of message received from the port devices is an unsolicited message, i.e. data which is sent to its associated port without a specific request. These unsolicited messages include commands from a local or remote PC, as well as messages which are sent automatically by IED devices to report specific activity or conditions recognized by a protective relay IED. These include event report summaries, status reports and group setting switch reports which indicate a change in the group settings of a particular relay. Unsolicited command messages can either be messages which the communications processor is specifically programmed to recognize, or user-defined commands which set control bits which are then used by the command logic to carry out the desired machine functions.

In addition to the above, there are other important processing routines which occur in the apparatus. For instance, processing is initiated/terminated by XON and XOFF characters. When such a character is received in an input ASCII data stream at a particular port, it does not go into the ASCII buffer. Instead, it sets an appropriate flag, which is used to enable or disable the transmit ISR. In the embodiment shown, if an input buffer, either binary or ASCII, exceeds 75% of its capacity, an XOFF flag is set. The transmit ISR reads this flag and inserts an XOFF character into its output data stream. Subsequently, when it is detected that the input buffer has dropped below 25% capacity, an XON flag is set. The transmit ISR reads this flag and inserts an XON character into its output data stream. Once an XOFF flag has been recognized by an ISR, the only valid character to be transmitted by the ISR subsequently is an XON or XOFF character. Otherwise normal transmission is disabled.

Further, in the embodiment shown, when a receive buffer (ASCII or binary) exceeds 50% full or alternatively, no characters have been received for more than approximately 60 milliseconds, the associated port task, e.g. port task 100, is initiated by the periodic interrupt timer ISR. This is accomplished by setting a character received bit in the operation field of the port's port structure.

Typically, an IED will only transmit to its particular port. However, when the port is in the transparent mode, it will transmit data to a different port defined in the requester field is its own port data structure. To initiate such a message transmittal to the different port, the requesting port task writes the message information to the port structure of the desired port and then sets the initiate-transmit flag for that particular port. When this flag is detected, the transmit ISR for that port is enabled. When the transmit ISR detects the end of the desired data, it then sets the transmit complete bit, and the transmit complete operation bit is then set in the initiating port task's operations field is its own port data structure.

Whenever a character is received at a particular port, the periodic interrupt timer ISR resets a time-out timer associated with that port task. If the time ever does expire, the port task is reinitiated, by setting the port time-out bit within the operations field of that port's port structure. Ports in the transparent mode then use the time-out bit to initiate termination of the transparent mode, while master ports use it as a suit command.

As shown in FIG. 3 and mentioned above, individual port tasks are capable of communicating with each other. This is necessary for a number of reasons, including the accomplishment of the following functions: port reset, settings changes, transparent mode initiation, transparent mode termination, autoband operation and autoconfiguration operation. In a port reset operation, the port task requesting the change sets the port reset bit within the operations field of the other port's port structure and sets the requester field. The receiving port task must reinitialize its configuration. It is disabled as long as it is being reset. When the reset is complete, the initiating port task is notified.

When the settings for a particular port task are changed (so as to request a different issue condition or different data), the process must be controlled to prevent simultaneous changes in other port tasks. Every affected port task, however, must know about the change. The port task performing the changing of the settings initially sets a flag to the port task and the fast meter task for the affected port, so as to prevent those tasks from actively using the settings. Those flags are cleared once the settings changes are accomplished.

As indicated above, the various ports in the communication processor can operate either in a "transparent" mode or a normal mode. In a transparent mode, the data is moved through the communications processor without any processing. The communications processor is thus transparent to the data. A master port may initiate transparent mode communication based on a received command. There is first a verification of the particular port which is to go into the transparent mode, and the request bit within the operations field of that port's port structure is then set to the transparent mode. If a requested port is able to go into transparent mode, it must also set a transparent mode initiate bit in the operations field of the master port's port structure.

To terminate the transparent mode, the master port sets the transparent mode terminate bit within the operating field of the transparent port's port structure and then sets that port's port event. The slave port, upon recognizing this operation, sets the transparent mode terminate bit within the operations field of the requesting port's port structure, and clears the request field within its own port structure.

FIGS. 5 and 6 show the generalized flow of functions for the port task 100 and the PIT ISR, consolidating in simplified form the information provided above. The port task is generally event driven, while the PIT ISR runs every 3.9 milliseconds as indicated above.

The operation of the communications processor is illustrated in the following example involving the connection of a protective relay to one IED port. Initially, the protective relay is connected to a selected IED back panel port. A terminal or computer is typically connected to the front panel port. The initial command settings from the front panel port terminal produce the proper formatting data for communication with the particular IED. In some cases, when it is a particular known device, automatic configuration of the port is possible. Otherwise, the specific baud rate, data bits, stop bit, etc. parameters must be established with the connected device. A wide variety of baud rates (up to 38,400, depending upon port configuration) may be accommodated. An XON and XOFF "handshake" is used to initiate and terminate communication.

Following this port configuration process, data communication involving the sending and receiving of messages between a user, such as a terminal, computer or remote unit and the connected IED device can occur. Settings may also be established which request certain data from the connected IED at certain times. The obtaining of data can be done on an automatic, periodic basis or on a one-time basis. The parsing rules for the data processing are also established. User-defined commands for the particular port are also established, to be used by the command logic in the apparatus. Upon the occurrence in time of the issue condition (periodic, specific time, specific day, etc.), a request for the data specified in the command condition portion of the setting will be provided by the port task to the transmit better and then through the output ISR for the desired port to the relay.

The relay will respond in a short period of time, such as with meter data, at the issue condition intervals. The data comes in through the input ISR and, if it is fast meter data (in binary code), will be applied to the binary buffer, and then to the fast meter acquire task, from where it is processed and then sent to the database. If the data is not fast meter data, then it is processed (parsed) by the port task and stored in the RAM database. If the data is an event report, or other data requiring long-term storage, it may be stored in flash memory. Data in the database is selected and retrieved from the database via the port task and provided through a selected port to either a local terminal or a remote terminal on an automatic or one-time basis, where the data can be reviewed and analyzed, as desired.

Accordingly, a power system multi-port communications processor has been described which is capable of multi-task, multi-user communications processing for a variety of intelligent electronic devices, such as protective relays, thereby producing a sophisticated communication integration capability at a power system substation. The communications processor includes the ability to configure the communication parameters of each of the ports to match that of the selected device attached to it, as well as a database capability for storing data and a communications processing capability for processing the data.

Although a preferred embodiment of the invention has been disclosed herein for illustration, it should be understood that various changes, modifications and substitutions may be incorporated in such embodiment without departing from the spirit of the invention, which is defined by the claims which follow.

What is claimed is:

1. A communications processor apparatus for integrating communication between a plurality of electronic devices having data communication capability present at a given location in a power system or connected remotely thereto, the apparatus comprising:

an electronic network system having a plurality of port positions to which electronic devices may be connected, including at least one port position to which an apparatus for entry of control commands may be connected and at least one port position through which data obtained from said electronic devices may be transmitted to other electronic devices;

receiver-transmitter means for communication of data between a) an electronic device connected to a port position of the communications processor apparatus and b) the remainder of the communications processor apparatus;

means for configuring communication parameters associated with each port position for proper data communication with the electronic device connected thereto;

means for storing and retrieving data obtained from the electronic devices;

means for storage of control commands entered by a user of the apparatus;

means for processing data obtained from the electronic devices, *wherein the means for processing data includes means for parsing received data in accordance with selected rules*; and control means for controlling the flow of data and control commands within the apparatus and between said [ports] *port positions*.

2. An apparatus of claim 1, wherein the ports to which protective relays or meters are connected are identified as Intelligent Electric Device (IED) ports, and wherein the ports to which a terminal or modem device are connected are identified as master ports, and wherein the apparatus includes at least one master port and at least six IED ports.

3. An apparatus of claim 2, wherein the apparatus includes a port to which a printer may be connected for printing out data obtained from the IED ports.

4. An apparatus of claim 1, including means for automatically configuring a port for selected devices.

5. An apparatus of claim 1, wherein the communication parameters include baud rate, number of data bits, stop bit and parity bit.

6. An apparatus of claim 1, wherein the receiver-transmitter means comprises a plurality of quad universal asynchronous receiver-transmitter means, each of which services a plurality of ports.

7. An apparatus of claim 1, wherein the apparatus is responsive to control commands, including user-defined commands to carry out specific functions associated with the control commands.

8. An apparatus of 7, including means for automatically requesting of and obtaining data from a particular port device in response to a command setting for said particular port.

9. An apparatus of claim 1, including a plurality of contact input means for accepting signals from protective relays and a plurality of contact output means for providing output signals.

10. An apparatus of claim 9, wherein at least one of those output signals is an alarm signal.

11. An apparatus of claim 1, including means for providing time information for synchronizing time clocks for each of the devices connected to said ports.

12. An apparatus of 11, wherein a source of the time information is an externally generated IRIG-B time code signal.

13. An apparatus of 11, including an internal clock for generating the time information.

14. An apparatus of claim 1, including means for making the apparatus transparent to received data from a port.

15. An apparatus of claim 14, wherein the apparatus can be transparent to data from more than one port simultaneously.

16. An apparatus of claim 1, including an internal modem to which an external telephone line may be connected for transmission of selected data to a remote location.

17. An apparatus of claim 1, wherein the apparatus includes buffer storage associated with each port.

18. An apparatus of claim 1, including means for temporarily storing data which has been received from the individual ports and parsed.

19. An apparatus of claim 1, including a long-term non-volatile memory for storage of selected data.

20. An apparatus of claim 1, including buffer means at each port for separate storage of binary format and ASCII format data.

21. An apparatus of claim 1, including means for processing and storing fast meter binary data from IED devices.

[22. An apparatus of claim 1, wherein the data processing means includes means for parsing received data in accordance with selected rules.]

23. An apparatus of claim [22] *1*, wherein the parsing rules are pre-established.

24. An apparatus of claim [22] *1*, wherein the parsing rules are defined by an operator.

* * * * *